H. BRICKER & E. FISHER.
POWER DEVICE.
APPLICATION FILED JUNE 2, 1917.
1,270,110.
Patented June 18, 1918.
2 SHEETS—SHEET 1.
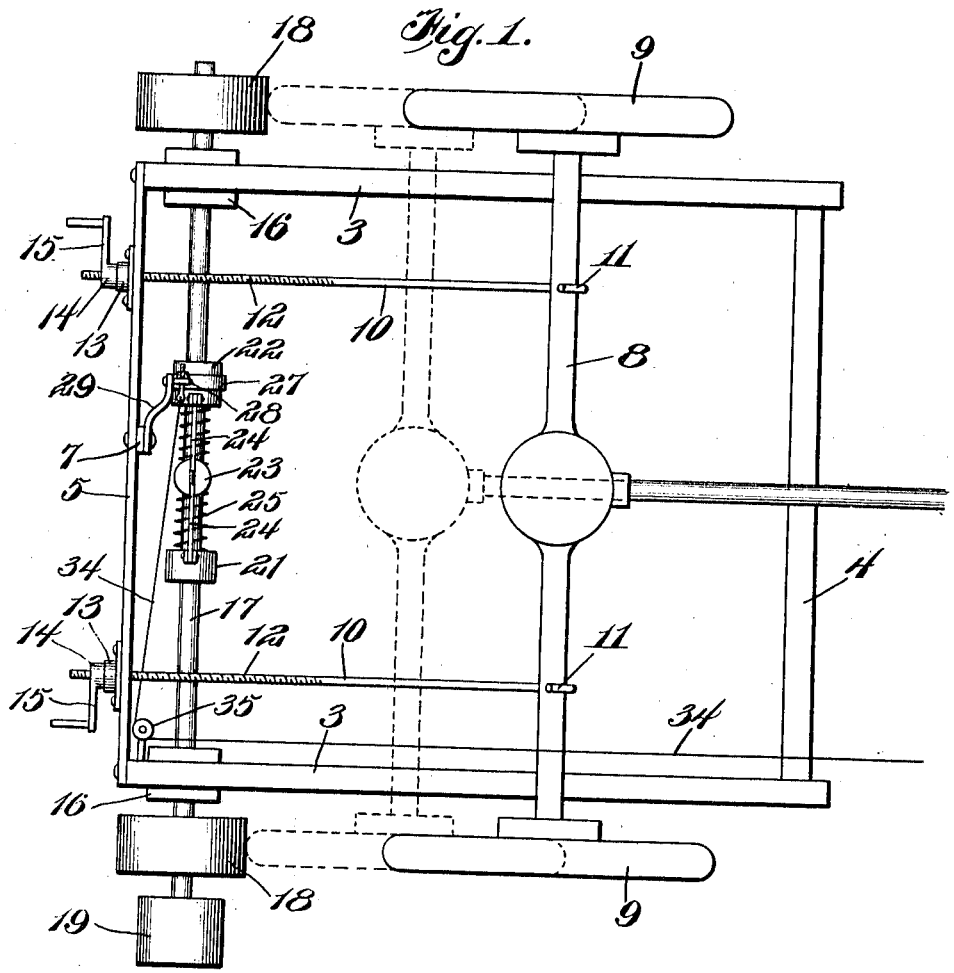
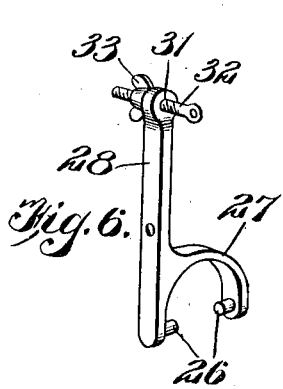
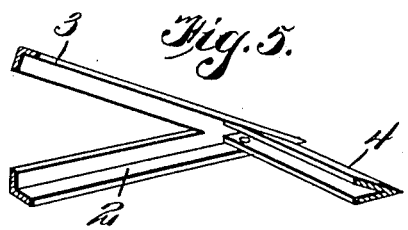
Inventors
H. Bricker
E. Fisher
By C. C. Hines,
Attorney

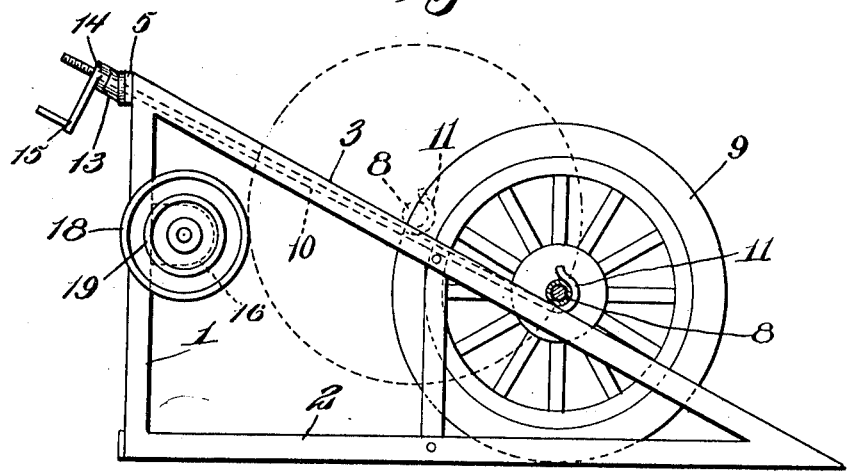
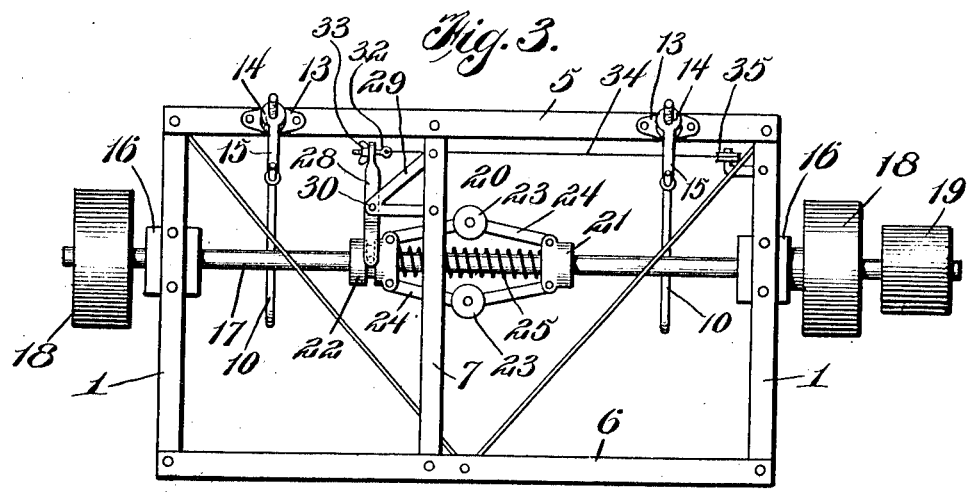
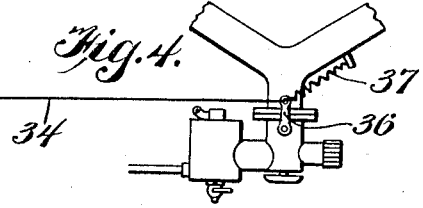

UNITED STATES PATENT OFFICE.

HAVEL BRICKER AND ESTELL FISHER, OF PITTSFORD, MICHIGAN.

POWER DEVICE.

1,270,110.

Specification of Letters Patent.   Patented June 18, 1918.

Application filed June 2, 1917.   Serial No. 172,511.

*To all whom it may concern:*

Be it known that we, HAVEL BRICKER and ESTELL FISHER, citizens of the United States, residing at Pittsford, in the county of Hillsdale and State of Michigan, have invented new and useful Improvements in Power Devices, of which the following is a specification.

This invention relates to a power device especially adapted for use in transmitting power from the driving shaft and wheels of an automobile to an auxiliary or power shaft, for the transmission of the power for driving farm, shop, or other desired kinds of machinery.

The primary object of the invention is to provide a power device of this character which is simple of construction, adapted to hold the driving shaft of the automobile in proper operative position for action upon the auxiliary or power shaft, and capable of automatically maintaining a predetermined speed of rotation of said shafts.

A further object of the invention is to provide a power device embodying novel means for automatically controlling the speed of the shafts through a controlling action upon the throttle valve of the automobile.

With these and other objects in view, the invention consists of the features of construction, combination and arrangement of parts, hereinafter fully described and claimed, reference being had to the accompanying drawings, in which:—

Figure 1 is a top plan view of the power device, shown in connection with the driving shaft and wheels of an automobile, arranged in operative relation thereto.

Fig. 2 is a side elevation of the device, the driving axle of the automobile appearing in section.

Fig. 3 is a rear elevation of the power device.

Fig. 4 is a detail view showing the throttle valve controlling means.

Fig. 5 is a detail perspective view of a portion of the frame of the power device.

Fig. 6 is a perspective view of the governor controlled throttle regulating lever.

In the practical embodiment of our invention, we provide a frame 1, which is preferably of the form shown, comprising triangular side members 2 including upper inclined rails 3, said side members being connected at their forward ends by a cross piece 4 and at their rear ends by upper and lower cross pieces 5 and 6, said cross pieces 5 and 6 being centrally connected by an upright 7. The frame as thus constructed may be made of angle-iron, and the rails 3 are designed to form inclined supports on which the rear axle 8 of the automobile rests and is supported in the operation of driving the power device therefrom. The rails 3 are spaced a distance somewhat less than the length of the axle 8, so that the rear driving wheels 9 of the automobile will be disposed outside of said rails when the axle 8 is resting thereon.

For the purpose of holding the automobile in position and the wheels 9 in adjustable relation to the auxiliary or power shaft of the power device, holding rods 10 are provided, which rods are formed at their forward ends with hooks 11 to engage the axle 8 and are threaded at their rear ends, as at 12 and pass through suitable guides or bearing members 13 upon the frame bar 5. Securing and feeding nuts 14 engage the threaded ends of the rods and contact with the bearings 13 to adjustably secure the rods in position, and said nuts 14 are provided with crank handles 15 whereby they may be rotated to feed the rods forward or backward in an obvious manner.

Supported by the side members of the frame 1 are bearings 16 in which is journaled a horizontal transverse auxiliary or power shaft 17, which shaft extends at its ends beyond the side members of the frame. The said projecting ends of the shafts are provided with drive pulleys 18 for frictional engagement with the automobile wheels 9, and one end of the shaft is provided with a pulley 19 or other suitable means for transmitting power to the machine to be driven. In practice the frame 1 rests upon the ground, floor or any other suitable foundation, and the automobile employed is backed up until the axle 8 thereof comes into the full line position shown in Figs. 1 and 2, after which the cranks 15 are operated to turn the nuts 14 so as to feed the rods 10 rearwardly, whereby through the movement of said rods the automobile will be drawn to a further degree rearwardly and the axle 8 and wheels 9 elevated from the surface of the ground and the wheels 9 thus brought into frictional driving engagement with the pulleys 18, as shown in dotted lines in Figs. 1 and 2. When the automobile drive mechanism is then set into action, motion will be transmitted through the axle 8, wheels 9 and pulleys 18 to the shaft 17 in an obvious manner. After use, the automobile is allowed to slide downward and forward by its weight by rotating the nuts 14 in a retrograde direction, whereby the rods 10 are fed forward to allow the axle 8 to slide down the inclined tracks 3, as will be readily understood.

Mounted upon the shaft 17 is a governor 20 of the centrifugal type, including a fixed collar 21, rotatable with said shaft, a movable collar 22, rotatable with and slidable longitudinally of said shaft, weights 23, and link arms 24 pivotally connecting said weights with the collars, together with an expansion spring 25 which normally holds the collars 21 and 22 spread a maximum distance apart. The collar 22 is annularly grooved to receive pins 26 upon the yoked or forked end 27 of a regulating lever 28, pivotally mounted upon a bracket 29 on the frame, as indicated at 30, and having its opposite end formed with a threaded eye 31 receiving an eye bolt 32 carrying a screw and adjusting nut 33.

A controlling cord or wire 34 is fixed at one end to the eye bolt and thence extended around one or more guide pulleys 35 on the frame beyond the forward end thereof, the forward or free end of said cord or wire being in practice connected with the throttle lever 36 of the throttle or feed valve of the engine of the automobile, which valve controls the supply of gasolene or other fuel to the engine. A spring 37 is connected with the lever 36 and normally maintains said lever to hold the throttle valve normally open to any desired degree for the supply of fuel to the engine. In the operation of the automobile drive gearing to rotate the shaft 17 it will be understood that said shaft 17 may run at any desired speed to a predetermined maximum speed at which the governor 20 is influenced to effect the movement of the collar 22 toward the collar 21 against the resistance of the spring 25, such action being due to the outward movement of the weights 23 under centrifugal force to a greater or less degree according to the speed of rotation. Such movement of the collar 22 swings the regulating lever 28 so as to cause it to draw upon the cord or wire 34 to move the throttle valve lever 35 to close the throttle valve to a greater or less extent according to the speed of the shaft 17, whereby the supply of fuel will be automatically controlled to govern the speed of the automobile engine and consequently the speed of the shaft 17. By this means racing of the engine and shaft will be avoided and the speed of rotation of the shaft will be automatically controlled in such a manner as to insure the rotation of the shaft at a substantially even and regulated rate of speed. By means of the bolt 32 and nut 33 any slack of the cord or wire may be taken up, and the length of said cord or wire adjusted to regulate the action of the throttle within determined limits to control the speed of the engine, and it will, of course, be understood that the speed of the engine and that of the shaft 17 may be governed by using springs 25 of different degrees of strength, thus rendering the apparatus capable of use with automobiles of different makes and having motors varying to a wide extent in power.

The mode of use of the device will be readily understood from the foregoing description, taken in connection with the accompanying drawings; and it will be seen that the invention provides a device of this character which is not only simple of construction and capable of being manufactured and sold at a comparatively low cost, but which either in its primary or slightly modified forms may be used in connection with a wide range of vehicles of different makes for securing power to drive machinery for various purposes. The device is also sufficiently light in weight to be handled and transported with facility and of sufficiently small size to occupy but a minimum amount of working space, the advantages of which will be obvious.

Having thus fully described our invention, we claim:

1. A power device of the character described comprising an open work frame having inclined tracks to support the driving axle of an automobile, drive gearing upon the frame adapted for frictional driving engagement with the wheels of said axle, hooked rods upon the frame to engage the axle for adjusting the same upon the tracks and holding said axle in working position, and screw gearing coöperating with the rods for adjusting and locking the same.

2. A power device of the character described, comprising a frame structure having inclined track rails to support the rear driving axle of an automobile, a transverse shaft journaled on said frame and adapted for driving engagement with the wheels of the axle, speed governed means associated with said shaft, and means controlled thereby for automatically governing the fuel feed mechanism of the engine.

3. A power device of the character described comprising a frame structure having inclined track rails to support the rear axle of an automobile, a transverse power shaft journaled on said frame and adapted for driving engagement with the wheels of the axle, means upon the frame for holding the axle and wheels in position, a centrifugal governor carried by the power shaft and including a member movable against resistance by centrifugal force when the shaft exceeds a certain speed, a regulating device controlled by said member, and a cord or wire connected with said regulating member and adapted for connection with a fuel feed device of the automobile motor, for controlling the speed of the motor and power shaft.

In testimony whereof we affix our signatures.

HAVEL BRICKER.
ESTELL FISHER.